INVENTOR
Robert C. Belgau
BY A. R. McCrady
ATTORNEY

March 9, 1948. R. C. BELGAU 2,437,453
ELECTRICAL HEATING APPARATUS FOR LIQUIDS
Filed July 9, 1945 3 Sheets-Sheet 3

INVENTOR
Robert C. Belgau
BY A R McCrady
ATTORNEY

Patented Mar. 9, 1948

2,437,453

UNITED STATES PATENT OFFICE 2,437,453

ELECTRICAL HEATING APPARATUS FOR LIQUIDS

Robert C. Belgau, Detroit, Mich.

Application July 9, 1945, Serial No. 603,776

9 Claims. (Cl. 219—38)

This invention relates to heating apparatus, and more particularly to electrical apparatus for heating material in liquid or solid form.

One form of the invention comprises an electrical resistance heating device which is submerged within a liquid heating medium. A series of conduits or baffle plates conduct the liquid heating medium in a circulatory path over the heated surfaces in a manner which induces a thermo-siphon circulating action of the heating medium when the device is in operation.

There are many industrial processes wherein it is desired to heat a material at a rapid rate, while insuring that no part of the material is brought to a temperature which would produce burning or deterioration thereof. The requirement for accurately controlled heating means is especially stringent in the case of pharmaceutical or chemical formulations, thermo-plastic compositions, foodstuffs, and similar products which deteriorate rapidly when exposed to excessive temperatures.

Such materials have in the past been heated by various methods. In one system, a central steam-generating plant, utilizing coal or other fuel, supplies superheated steam to the various vessels containing the material to be heated. The temperature of the superheated steam may in such installations be accurately controlled, so as to limit the maximum temperature to which the material will be subjected. The method is wasteful and unsatisfactory in many cases, however, since it is necessary, in order to heat a single container, that the entire steam-generating plant be put into operation, with consequent excessive fuel waste when this central heating system is working on partial loads. Heat losses in conveying the steam to the point of use may also be considerable, and the system as a whole lacks flexibility, the installation is costly, requires costly maintenance of the high-pressure steam lines, leaky valves, pumps and other accessories; and requires frequent retubing of the boilers, fire box, rebuilding and the like.

Combustion gases are also applied to the heating of a liquid heating medium, which in turn transfers its heat to the product to be heated, thus generating the heat at the point of use. Thus method is very satisfactory in applications where an electrical heating means is not desired or required.

In many applications where inflammable products are being processed, heating with combustion gases is not desirable due to fire hazard; and, in any event, various firms prefer electrical heating equipment. The conventional method of employing electrical resistance heating for industrial processing is acomplished in two ways:

(a) With immersion heater elements which are immersed in a suitable heating agent, or directly immersed into the product to be heated; or (b) By securing stripheaters to the exterior walls of the tank jacket; or directly against the wall of the tank which contains the product.

The use of either of these two methods is limited by certain resulting characteristics, outlined as follows:

1. Immersion heaters are not recommended for directly heating oil, Dowtherm and similar heating agents, except where the oil or other heating agent is well agitated, or circulated, to prevent carbonization of the agent on the sheath of the heater element; otherwise the watt-density per square inch of heating area must be greatly reduced to prevent carbonization or deterioration of the heating agent. The use of the immersion heater for directly heating certain products is not at all satisfactory because of the burning, or deterioration, of the product.

2. The use of stripheaters, as outlined, is not satisfactory for many applications because of the following results:

Only one side of the stripheater is in contact with the tank wall, therefore heat units, radiating from the other three sides of the stripheater build up the temperature of the heater chamber with a corresponding inefficiency and prolonged heating cycle.

Furthermore, the tank wall is used as a heat-conductor, in these applications. This means that the mass of heaters, anchor studs and clamps, plus the wall mass provide a large storage area for heat units at a higher temperature than that to which the product is to be heated. When the current supply is cut off, these stored heat units continue to flow into the product with consequent over-shooting of the desired temperature. When the current is again turned on, this mass must be again raised to the higher temperature before heat units will flow into the product. This causes a lag which may permit the temperature of the product to drop before the heat flow is again restored.

My invention embodies a design with certain features and advantages which eliminate the objections described in the preceding paragraphs, and provide a measure of flexibility and economy not heretofore accomplished.

The conventional immersion elements and stripheaters, previously described, are only a heat source and are not a complete heating device. The immersion unit, in most instances, requires a circulating pump in conjunction therewith, whereas the stripheaters require the tank wall to serve as a conductor and an ambient or heater chamber to retain the heat units which are not conducted directly to the tank wall.

However, my invention is a complete heating cell designed and constructed so as to induce a thermo-siphon circulating action, thereby dispensing with the need for pumps or circulators.

This heating cell embodies a tubular construction which will withstand low-pressure operation, or very high pressure operation, equally well and provide great economy in either operation. The tubular heating areas of the cell are so arranged and submerged in the liquid transfer medium to be heated, that nearly all of the heat units generated by the resistance elements are transmitted directly to the heating medium, and, by means of a system of stacks or baffles, the application of heat produces a thermo-siphon action of the heating medium, thus continually presenting to the heating areas the relatively cool portions of the medium. The heated medium is thus in part converted to vapor, which in turn conducts heat to the product to be heated.

An object of the present invention is to provide a heating device of simplified construction which will avoid the disadvantages of the prior art devices above outlined, in that it will be independent of other units and dependent only upon a supply of electricity at the site of heating.

A further object of the invention is to provide a heating unit of relatively large heating area and directly attached to the container of heating medium, occupying a minimum amount of surface area thereof, so that a large number of heating cells may be applied to a given container.

A further object of the invention is to provide a heating unit in which substantially all of the heat units are transferred to the liquid to be heated, the container itself being heated only by the liquid, rather than serving as a heat conductor as when conventional stripheaters are employed.

A further object of the invention is to provide an electrical heating unit wherein the electrical resistance elements may be withdrawn and replaced without draining the heating medium from the tank, or otherwise disturbing the contents.

A further object of the invention is to provide a heating unit wherein the liquid being heated will be caused, by thermo-siphon circulatory action, to flow in contact with the heating areas so that the liquid will be brought to a desired uniform temperature in the minimum period of time.

A further object of the invention is to provide a tubular construction which will withstand a wide range of pressures so that a heating cell having a given wall thickness can be used in practically all applications without consideration of operating pressures.

A further object of the invention is to provide a standard heating cell wherein the wall thickness, heating element size and shape, thermo-siphon actuating means and other pertinent factors can be maintained so as to provide a completely engineered heating cell which can be used for applications heretofore impracticable.

A further object of the invention is to provide a heating cell having therein an electrical resistance element which can be made in three separate segments, each with its own terminals, but assembled as an integral unit, to accommodate single- and three-phase current without overloading any leg of the three-phase system.

A further object is to provide an electric heating device which can be employed as an immersion unit, to heat products directly, without deterioration of the product by lack of proper temperature control and distribution.

Still another object is to provide an immersion heating device which need not be attached to the product container but merely suspended within it, or resting upon the top sides thereof, but immersed partially or completely within the product to be heated, so that the heating device can be removed and cleaned at will without dismantling or disconnecting the heating system or vessel with which it is used.

A further object is to provide a complete vapor-heating unit of any suitable size and shape, and of any suitable material but which is complete unto itself and dependent only upon a supply of electricity.

A further object is to generate heat units at the immediate site of use; to dissipate those heat units directly into the product to be heated; and to generate only the number of heat units required to accomplish the processing operation.

Further objects and advantages of the invention will be apparent from the following description, taken in connection with the appended drawings, in which.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
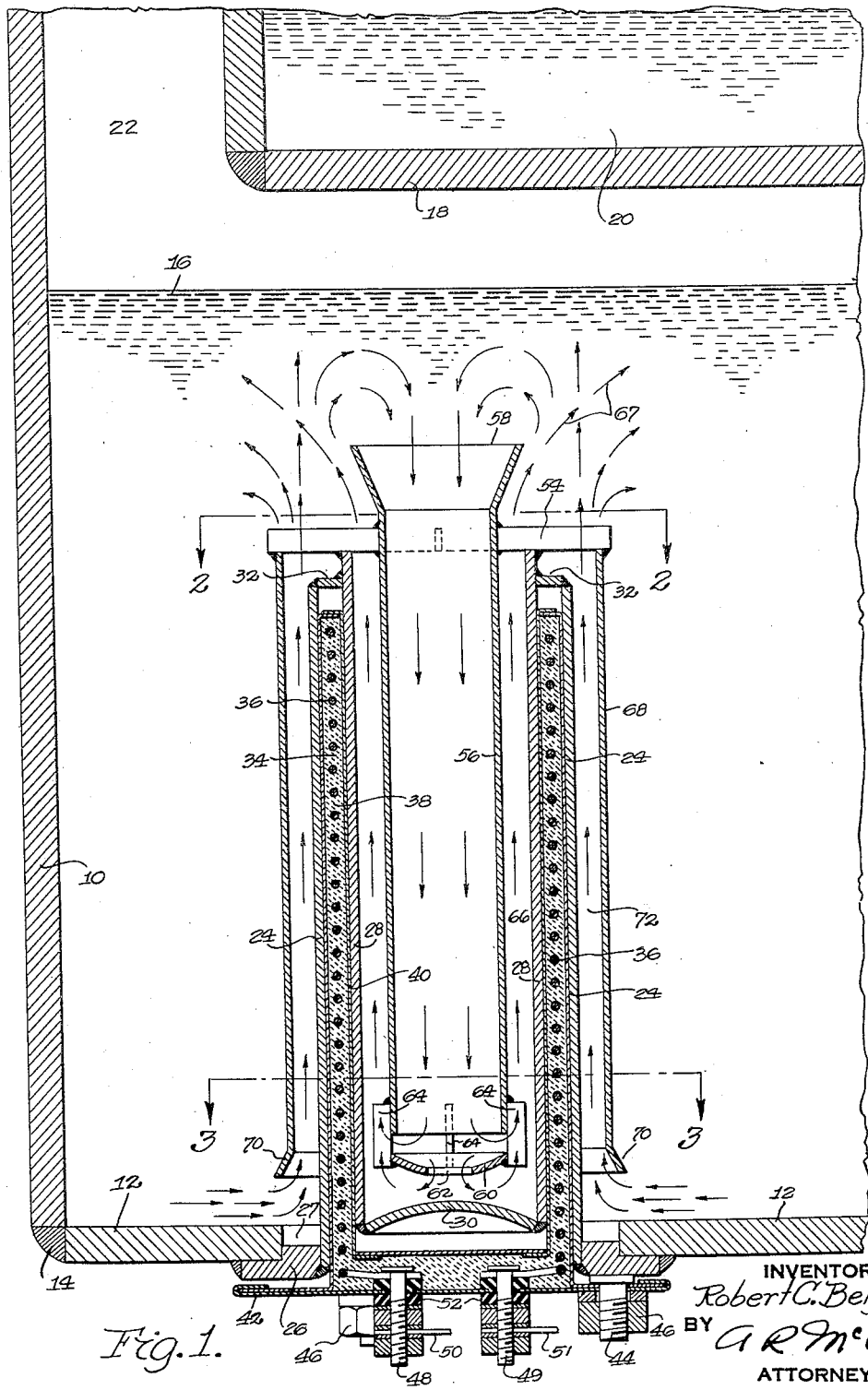
Fig. 1 is a view in vertical section of a device embodying the invention.

The apparatus shown in Fig. 1 comprises an outer tank 10, of sheet metal or the like, having a bottom 12 secured thereto in any suitable manner as by welding, as indicated at 14. Contained in the tank 10 is a liquid heating medium 16, which may be a non-volatile oil, diethylene glycol, Dowtherm or the like, having suitable characteristics as to high boiling point, low latent heat of vaporization, and other qualities. Within the tank 10, and spaced therefrom on all sides, is a container 18 for the material 20 to be heated. The tank 10 is closed and sealed at its upper end by means not shown, the arrangement being preferably such that when the heating medium 16 is at room temperature a considerable degree of vacuum will exist in the space 22 above it. The container 18 may be closed by a lid or other usual means, not shown. When the heating medium 16 is raised to its boiling point, vapors therefrom will fill the space 22 and transfer the heat to the inner container 18 in a uniform manner, the temperature of the vapors at 22 being gauged either by a pressure gauge or by a thermostat connected to the space 22. The foregoing, being known practice in the art, is believed to be clear without further explanation.

The heating unit shown in Fig. 1 comprises a cylinder 24 which is secured, as by welding, to an annular flange 26, the flange being in turn secured to the periphery of an annular orifice 27 formed in the bottom 12 of the tank. Within the cylinder 24 is mounted an inner shell comprising a cylinder 28 and a bottom 30, the latter being preferably of the concave shape shown, the better to resist pressures developed in the tank 10. The shell is connected to cylinder 24 by means of an annular flange 32, which is secured to both members as by welding.

Within the space between cylinders 24 and 28 is removably mounted a cylindrical heating element 34, which may be made up in the usual manner of electrical resistance wire 36, ceramic insulating material 38, and a thin shell 40 of copper or other suitable material. The lower portion of the outer part of the shell 40 is formed with a radial flange 42, in which are formed a plurality of apertures which receive studs 44 fixed in any suitable manner to the flange 26. By means of these studs, and of nuts 46 mounted thereon, the heating element is secured in place in the unit. Binding posts 48, 49 connect the ends of the resistance wire 36 to leads 50, 51, which lead to a source of electrical current, insulating washers 52 being used to insulate the circuit, thus formed, from the shell of the heating element. The electrical apparatus may be provided with suitable switches, and with one or more thermostatic controls to maintain the temperature of the heating medium 16, or of the vapors in the space 22, or of the material 20, or all of them, at any desired value.

A spider 54 rests upon and is attached, as by welding, to the upper edge of the cylinder 28, and carries at its center a tubular member 56, having at its upper end a frusto-conical inlet 58, designed to receive the cooler portions of the liquid 16 adjacent the surface and to return them to the bottom of the tubular member 56.

At the bottom of member 56 is mounted a circular baffle plate 60, of convex shape as shown, and having a central orifice 62. The plate 60 is spaced from the bottom of the tubular member 56 and is held in position by a plurality of vertical ribs 64 which are welded to the two members. A part of the liquid, flowing downwardly through the tubular member 56, will pass through the orifice 62, and part will pass radially outwardly through the space betwene the member 56 and the baffle plate 60, returning upwardly via the space 66 between member 56 and cylinder 28. Upon reaching the upper end of the heating unit, it will be deflected outwardly between inlet member 58 in the direction of the arrows 67 shown in Fig. 1.

Suspended from the periphery of spider 54 is a cylindrical stack 68, which envelopes most of the heating unit, its lower end terminating in a flared flange 70. The function of the stack is to confine a predetermined volume of liquid within the cylindrical space 72 so as to induce a given rate of flow, of the liquid medium, in direct proportion to the volume of heat units which are applied. The rapid rate of flow, upwardly, of the liquid being heated, induces a corresponding rate of flow of the relatively cool liquid which is drawn into space 72 at flange 70 to replace the heated liquid which has moved upwardly and out of space 72. A thermo-siphon circulatory system is thus formed which results in continuous circulation of the heating medium without permitting any portion of the same to reach a dangerously high temperature.

The construction of the heating unit is such as to resist high pressures, as may be developed by the vapors in space 22 when high temperatures are being used. The cylindrical form of members 24 and 28 is well adapted to resist such pressures, and they are reinforced to some extent by the presence of the heating element 34.

It will be understood of course that the particular application of the heating unit herein described does not form an essential part of the invention, but that the heating unit may be applied to the heating of various liquids, whether such liquids are or are not used as a heating medium for other material.

Figure 4:
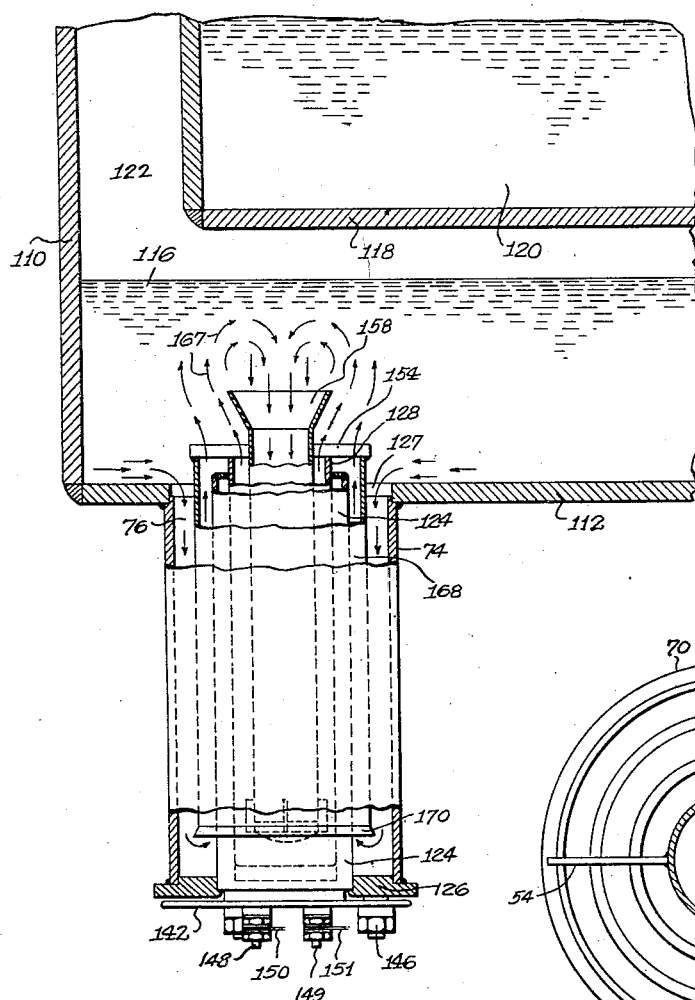
Fig. 4 is a view in elevation of a modified form of the device, parts being broken away to reveal the interior construction.
Figure 2:
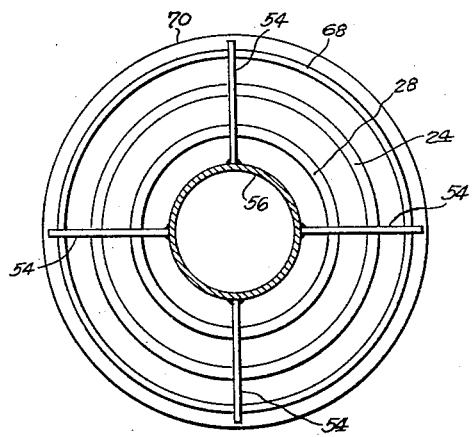
Fig. 2 is a horizontal section taken on the line 2—2 of Fig. 1.
Figure 3:
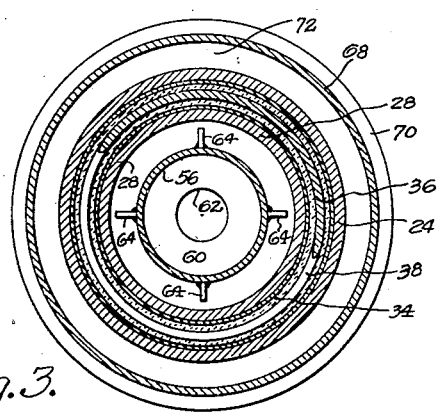
Fig. 3 is a horizontal section taken on the line 3—3 of Fig. 1.

In the embodiment of the invention shown in Fig. 4, many of the elements are similar to the corresponding elements of the device shown in Figs. 1, 2 and 3, and are designated by similar reference numerals with the addition of 100. The construction of the heating unit is similar to that shown in Figs. 1, 2, and 3 except that it is joined at its top rather than at its bottom to the bottom 112 of the tank 110. In this embodiment, an annular flange 126 is secured, as by welding, to the lower edge of cylinder 124, in the same manner as in the embodiment already described, but the flange 126 is secured to the tank by means of an outer cylinder 74 which is welded at its upper end to the edge of an aperture 127 in the bottom of the tank and at its lower end to the periphery of flange 126. The cylinder 74 may be provided with suitable heat insulating material, not shown. The cylinder 74 forms with stack 168 an annular space 76 whereby relatively cool liquid from the tank 110 may flow downwardly by thermo-siphon action to the bottom of said space, to be drawn thence upwardly past the flange 170 and passed into the mass of liquid in the manner indicated by the arrows 167 in Fig. 4. Relatively cool liquid from the surface of the heating medium 116 will also be drawn downwardly through the inlet 158, whence it will circulate upwardly adjacent the heating element in the same manner as explained in connection with Fig. 1.

The construction disclosed in Figs. 1, 2 and 3 is usually preferred in those installations where sufficient space is necessary and sufficient heating medium is used that the entire heating unit will be immersed in the heating medium. However, where space limitations do not permit such an installation, the arrangement shown in Fig. 4 may be used, even though but a small quantity of liquid is present in the tank 110. In either installation, the number of heating units which may be installed in a given tank is limited only by the space available in the bottom of the tank, or by considerations of structural strength, and since each of the heating units presents to the liquid a heating area several times greater than that of the tank surface which it replaces, the heating units may be utilized to apply heat to the liquid much more rapidly than would be possible by applying heat to the exterior of the tank in the usual manner.

Figure 5:
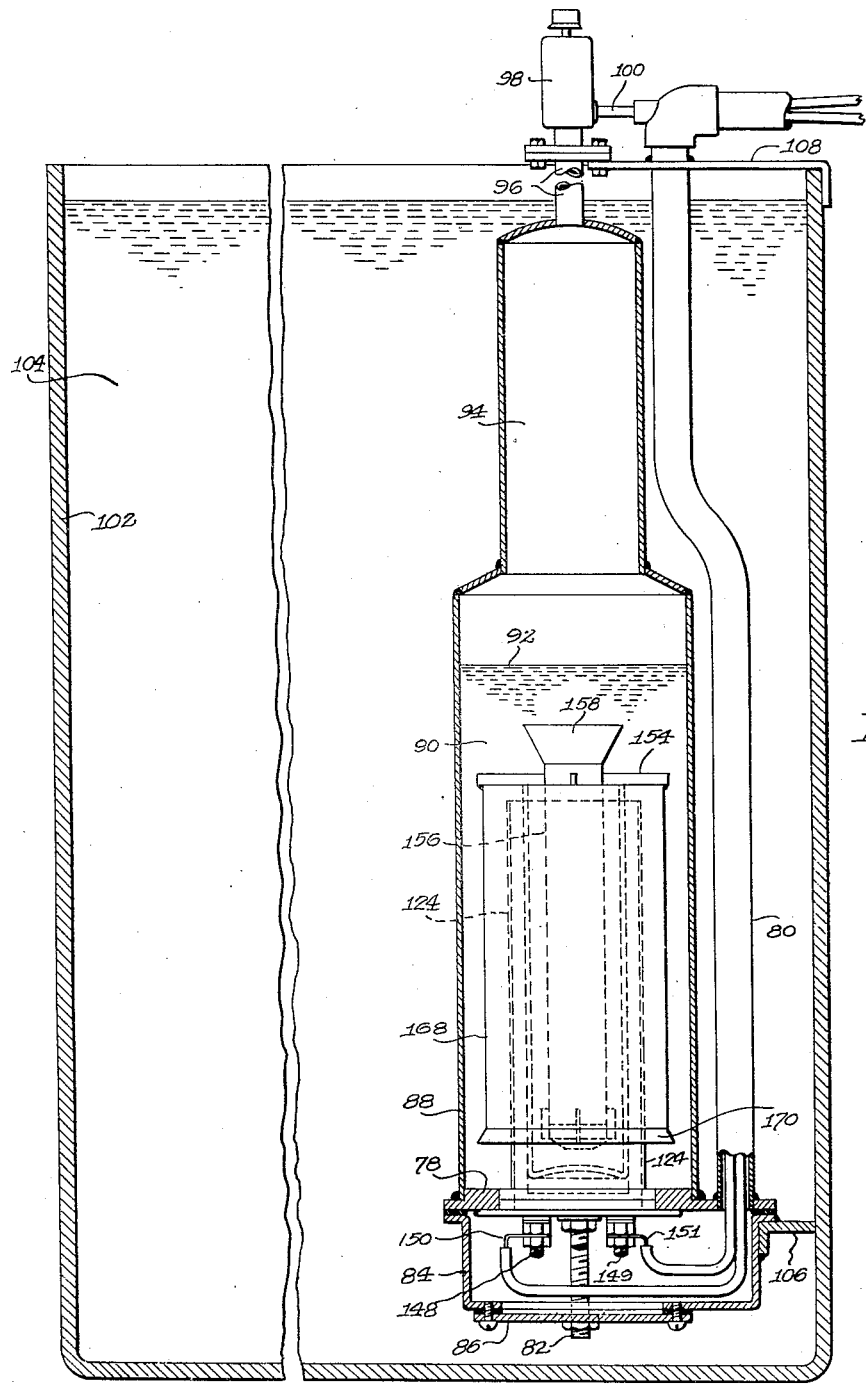
Fig. 5 is a view in vertical section of a further modified form of the device.

In the form of the invention shown in Fig. 5, the heating cell per se is identical with that shown in Fig. 4, and the parts are indicated by the same reference numerals. The base of the cell is mounted in an aperture in an annular member 78, similar to members 26 and 126, being secured therein by welding, as shown. Extending below the member 78 are binding posts 148, 149, to which are connected leads 150, 151 which extend upwardly through a conduit 80 to a source of electrical current. Studs 82 are fixed to member 78 and extend downwardly therefrom and serve to retain in place an electric outlet box 84, which is thus maintained in liquid-tight relation to member 78. It has a removable plate 86 to permit access to the interior thereof, and is so shaped at its right-hand side, as viewed in Fig. 5, as to conform to and communicate with the lower end of conduit 80.

Secured to and extending upwardly from the annular member 78 is a container 88 for a liquid heating medium, indicated at 90, which fills the container to a level 92 well above the flared inlet 158, so as to permit circulation of the heating medium by thermo-siphon action in the manner above described in connection with Fig. 1.

To the upper end of the container 88 is secured a vapor container 94, designed to receive the vapors generated by the heating medium 90 and transmit the heat therefrom to the material being heated. A pipe 96 leads from the upper end of container 94 and connects with a control mechanism 98, which may be a pressurestat of known type, such as is described in my copending application Ser. No. 603,341, filed July 5, 1945, which acts through electrical connections 100 to cut off the flow of electricity to the heating cell whenever the vapor pressure within the container 94 exceeds a predetermined value. Alternatively, a thermostat, responsive to the vapor temperatures, may be used in place of the pressurestat.

The heating unit of Fig. 5 is designed to be removably suspended within a process tank or other container 102 and to be immersed in the material 104 therein to such depth that the vapor container 94 thereof will be completely submerged. In order to provide for suspension of the unit in this manner while preventing direct contact between the body of the unit and the bottom or walls of the tank 102, a bracket 106 is secured to the outlet box 84 and projects therefrom in such manner as to engage the wall of the tank and thereby maintain the unit in spaced relation to the wall. At the upper end of the unit, a bracket 108 is fixed to the pipe 96 and conduit 80 and engages the upper edge of the tank 102, its outer end being downturned as shown to engage the outer surface of the tank.

It will be seen that the unit of Fig. 5 may be inserted in and removed from the material at will, and that when it is immersed in the material substantially all of the heat units which it generates will be conducted to the material being heated.

The heating cell disclosed in Figs. 1 to 4 may be used in installations originally equipped with other heating means, it being merely necessary in such cases to remove the original heating means, cut an aperture in the tank, and weld the heating cell in place. It is contemplated that the heating cell may be manufactured and sold as a separate unit, to be installed by the purchaser in process tanks or other containers in any of the forms hereinabove indicated.

Although the invention has been described with particular reference to certain embodiments thereof, it is not limited to such embodiments, but may be modified in accordance with the skill of artisans in this art. The invention is therefore not limited to the embodiments shown, nor otherwise except in accordance with the following claims.

I claim:

1. Heating apparatus for liquids, comprising a liquid container having an aperture in a wall thereof, a cylindrical member extending within the container and having at its lower portion a radially extending flange secured to the periphery of said aperture, a second cylindrical member within said first mentioned cylindrical member and spaced therefrom to form a cylindrical recess, means joining the upper ends of the cylindrical members in liquid-tight relation, a cylindrical electrical resistance element slidably seated in said recess, a cylindrical conduit positioned within the second mentioned cylindrical member and spaced therefrom and from said wall to permit circulation of liquid therebetween, and a cylindrical conduit positioned outside of the first mentioned cylindrical member and spaced therefrom and from said wall to permit circulation of liquid therebetween.

2. Heating apparatus for liquids, comprising a liquid container having an aperture in the bottom thereof, a hollow cylindrical heating member secured to the periphery of said aperture and extending vertically inwardly therefrom, and tubular members positioned within and outside of said heating member and spaced therefrom and from said bottom and from the sides of said container to permit circulation of liquid therebetween.

3. The invention defined in claim 2, wherein said tubular members are suspended from the upper end of said heating member, and the heating member includes an electrical heating element having electrical connections leading to the exterior of said container.

4. Heating apparatus comprising a closed container, a liquid heating medium occupying a portion of the space in said container, a second container within said first mentioned container spaced from the walls thereof and from said liquid heating medium and adapted to receive material to be heated, a hollow cylindrical heating member extending upwardly through the bottom of said first mentioned container and secured thereto, said heating member being so positioned as to be completely submerged in the liquid heating medium, an electric heating element in said heating member, and baffle members spaced from said heating member and from said bottom for facilitating the circulation of heating medium around the heating member.

5. Heating apparatus comprising a closed container, a liquid heating medium occupying a portion of the space in said container, a second container within said first mentioned container spaced from the walls thereof and from said liquid heating medium and adapted to receive material to be heated, a hollow cylindrical heating member extending upwardly through the bottom of said first mentioned container and secured thereto to form a cylindrical recess, a cylindrical electric resistance element seated in said recess, a cylindrical conduit positioned within the heating member and spaced therefrom and from said bottom to permit circulation of liquid therebetween, an apertured horizontal baffle mounted adjacent the lower end of said cylindrical conduit and spaced therefrom, and a cylindrical conduit positioned outside of the heating member and spaced therefrom and from said bottom to permit circulation of liquid therebetween.

6. Heating apparatus comprising two concentric cylindrical members joined at one end in fluid type relation to form a cylindrical recess, a radial flange fixed to the outer of said cylindrical members, a closed container secured to said flange and inclosing said cylindrical members, heating medium occupying a portion of the free space in said container and submerging said cylindrical members, a cylindrical electric resistance element removably seated in said recess, and baffles supported by said cylindrical members for directing flow of said heating medium both internally and externally of said cylindrical members.

7. The invention defined in claim 6, comprising in addition a fluid-tight conduit extending from adjacent the upper end of said container and secured to said flange, and electrical connections extending through said conduit and connected to said resistance element.

8. The invention defined in claim 6, comprising in addition a fluid-tight conduit extending from adjacent the upper end of said container and secured to said flange, electric connections extending through said conduit and connected to said resistance element, and means responsive to pressure within said container for controlling the flow of electrical current through said electrical connections.

9. Heating apparatus comprising two concentric cylindrical members joined at one end to form a liquid-tight cylindrical recess, a cylindrical electrical resistance element removably seated in said recess in contact with both of said members but electrically insulated therefrom, and means for directing fluid flow both interiorly and exteriorly of said cylindrical members, said means comprising cylindrical stacks located respectively inwardly of the inner cylindrical member and outwardly of the outward cylindrical member and supported by said cylindrical members.

ROBERT C. BELGAU.

REFERENCES CITED

The following references are of record in the file of this patent:

UNITED STATES PATENTS

| Number | Name | Date |
|---|---|---|
| 979,515 | Kuhn | Dec. 27, 1910 |
| 1,098,573 | Hauser | June 2, 1914 |
| 1,442,048 | Christian | Jan. 16, 1923 |
| 1,451,847 | Rowe | Apr. 17, 1923 |
| 1,456,863 | Blong | May 29, 1923 |
| 1,475,631 | Herbst | Nov. 27, 1923 |
| 1,876,053 | Hyde | Sept. 6, 1932 |
| 1,916,066 | Moyle | June 27, 1933 |
| 1,934,958 | White | Nov. 14, 1933 |